USU08733661B2

(12) United States Patent
Kilibarda (10) Patent No.: US 8,733,661 B2
(45) Date of Patent: May 27, 2014

(54) PRECISED TRANSPORT POSITIONING APPARATUS USING A CLOSED LOOP CONTROLLED, NON-DIRECT OR FRICTION DRIVE SYSTEM WITH ABSOLUTE POSITIONING ENCODER (75) Inventor: Velibor Kilibarda, West Bloomfield, MI (US)

(73) Assignee: Comau, Inc., Southfield, MI (US)

( * ) Notice: Subject to any disclaimer, the term of this patent is extended or adjusted under 35 U.S.C. 154(b) by 140 days.

(21) Appl. No.: 13/351,764

(22) Filed: Jan. 17, 2012

(65) Prior Publication Data
US 2012/0111948 A1 May 10, 2012

Related U.S. Application Data (63) Continuation of application No. 12/174,075, filed on Jul. 16, 2008, now Pat. No. 8,109,443, which is a continuation of application No. 11/497,131, filed on Aug. 1, 2006, now Pat. No. 7,416,130, which is a continuation of application No. 10/881,200, filed on Jun. 30, 2004, now Pat. No. 7,108,189.

(60) Provisional application No. 60/538,257, filed on Jan. 22, 2004, provisional application No. 60/483,700, filed on Jun. 30, 2003.

(51) Int. Cl.
*G06K 13/00* (2006.01)
(52) U.S. Cl.
USPC ......................... 235/475; 235/376; 310/12.02
(58) Field of Classification Search
USPC ................. 235/375, 376, 475; 310/12, 12.02
See application file for complete search history.

(56) References Cited

U.S. PATENT DOCUMENTS

| 4,404,505 A | 9/1983 | Swanson et al. |
| 4,505,464 A | 3/1985 | Chitayat |
| 4,698,996 A | 10/1987 | Kreft et al. |
| 4,808,901 A | 2/1989 | Sakamoto |
| 4,991,517 A | 2/1991 | Lotzer |
| 4,994,978 A | 2/1991 | Kawamura et al. |
| 5,337,881 A | 8/1994 | Kakida et al. |
| 5,575,389 A | 11/1996 | Alspach et al. |
| 5,658,120 A | 8/1997 | Watanabe |
| 5,730,276 A | 3/1998 | Itoh |

(Continued)

FOREIGN PATENT DOCUMENTS

| EP | 0340639 A1 | 11/1989 |
| WO | 01 58746 A1 | 8/2001 |
| WO | 01 71882 A1 | 9/2001 |
| WO | 03 026915 A1 | 4/2003 |

OTHER PUBLICATIONS

The European Search Report dated Mar. 10, 2010.

*Primary Examiner* — Daniel Hess
(74) *Attorney, Agent, or Firm* — Young Basile Hanlon & MacFarlane P.C.

(57) ABSTRACT

An apparatus for positioning a workpiece carrier with respect to a workstation can include a workpiece carrier movable relative to the workstation and having an encoder strip, at least one encoder reader located at the workstation for generating a signal in response to interaction with at least one encoder strip, and a drive engaging the workpiece carrier for moving the carrier relative to the workstation, the drive responsive to the signal from the encoder reader. A closed loop feedback control system can be provided for receiving the signal from the encoder reader, and for generating an output signal in response to the signal from the encoder reader in accordance with a program stored in memory.

19 Claims, 5 Drawing Sheets

(56) References Cited

U.S. PATENT DOCUMENTS

| | | |
|---|---|---|
| 5,942,870 A | 8/1999 | Koschorrek et al. |
| 6,137,255 A | 10/2000 | Skalski |
| 6,191,507 B1 | 2/2001 | Peltier |
| 6,281,655 B1 | 8/2001 | Poon et al. |
| 6,570,354 B1 | 5/2003 | Dobbertin et al. |
| 6,606,784 B1 | 8/2003 | Huff et al. |
| 2001/0045810 A1 | 11/2001 | Poon et al. |
| 2001/0054851 A1 | 12/2001 | Tsuboi et al. |
| 2002/0145398 A1 | 10/2002 | Knorr et al. |
| 2003/0021050 A1 | 1/2003 | Lam |
| 2003/0079964 A1 | 5/2003 | Kilabarda |
| 2003/0132672 A1 | 7/2003 | Watanabe |

PRECISED TRANSPORT POSITIONING APPARATUS USING A CLOSED LOOP CONTROLLED, NON-DIRECT OR FRICTION DRIVE SYSTEM WITH ABSOLUTE POSITIONING ENCODER

CROSS-REFERENCE TO RELATED APPLICATIONS

The application is a continuation application and claims benefit of pending patent application Ser. No. 12/174,075 filed Jul. 16, 2008 which is a continuation of patent application Ser. No. 11/497,131 filed Aug. 1, 2006, now U.S. Pat. No. 7,416,130, which is a continuation of patent application Ser. No. 10/881,200 filed Jun. 30, 2004, now U.S. Pat. No. 7,108,189, which claims benefit of the priority dates of U.S. Provisional Application Ser. No. 60/483,700 filed on Jun. 30, 2003 and U.S. Provisional Application Ser. No. 60/538,257 filed Jan. 22, 2004.

FIELD OF THE INVENTION

The present invention relates to an apparatus for precisely positioning a workpiece being transported along an assembly line by a closed loop feedback control system for a non-direct drive or friction drive system, and more particularly, an absolute positioning apparatus for use with the transport system where a reader can be positioned in a stationary location at a workstation and an absolute positioning encoder strip can be connected to the movable portion of the transport system for imparting information to the reader relating to pallet and/or workpiece position and/or pallet and/or workpiece identification.

BACKGROUND OF THE INVENTION

A modular conveyor system having multiple moving elements under independent control is disclosed in U.S. Pat. No. 6,191,507. The track includes multiple linear encoder readers spaced at fixed positions therealong, and each pallet includes a linear encoder strip having a length R greater than the spacing E between the readers. Track section controllers associate the encoder strips with only one reader at any time in order to resolve the position of the pallets based on the fixed position of the readers and the relative positions of the strips in relation thereto. The pallets include thrust producing magnets for travel independently along the track, where each track section includes a plurality of individually controlled coils stretching along the length thereof. The section controllers also regulate and commutate the coils of the corresponding track sections in order to independently control each pallet.

SUMMARY OF THE INVENTION

The present invention relates to a precise transport positioning system for non-direct, closed loop controlled, friction drive conveyors. The precise positioning system according to the present invention is suitable for use with a power roll conveyor system, and/or a versaroll conveyor system as commercially available from Progressive Tool & Industries, Co., a corporation of the State of Michigan, having its principal place of business at 21000 Telegraph Road, Southfield, Mich. 48034. An apparatus for positioning a workpiece carrier with respect to a workstation includes a workpiece carrier movable relative to a workstation. The workpiece carrier has at least one encoder strip. At least one encoder reader is located at the workstation for generating a signal in response to interaction with the at least one encoder strip. A drive engages the workpiece carrier for moving the carrier relative to the workstation, and the drive is responsive to the signal from the encoder reader for locating the workpiece carrier at a position relative to the workstation.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
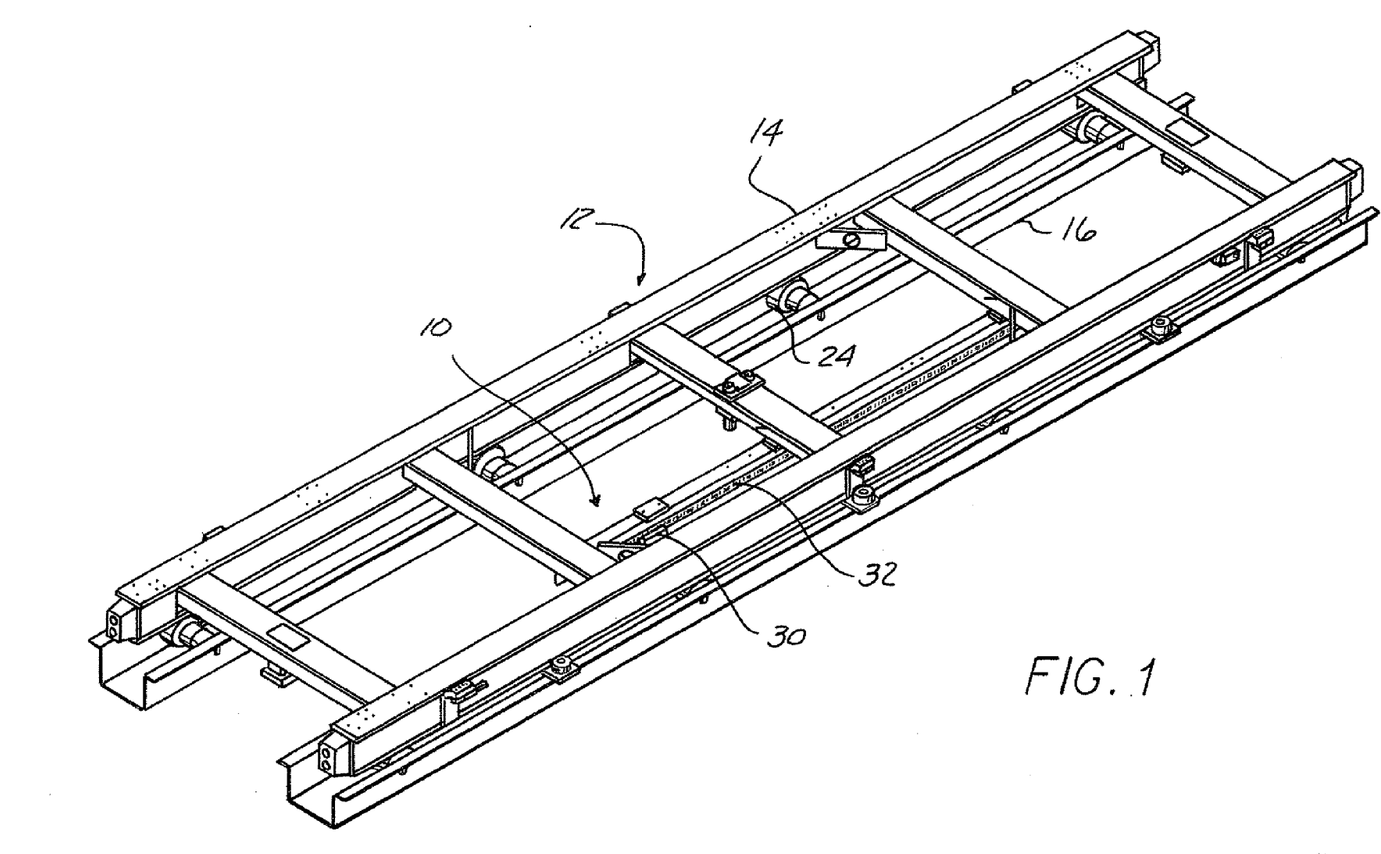
FIG. 1 is a perspective view of a transport system having a precise locating apparatus according to the present invention.
Figure 2:
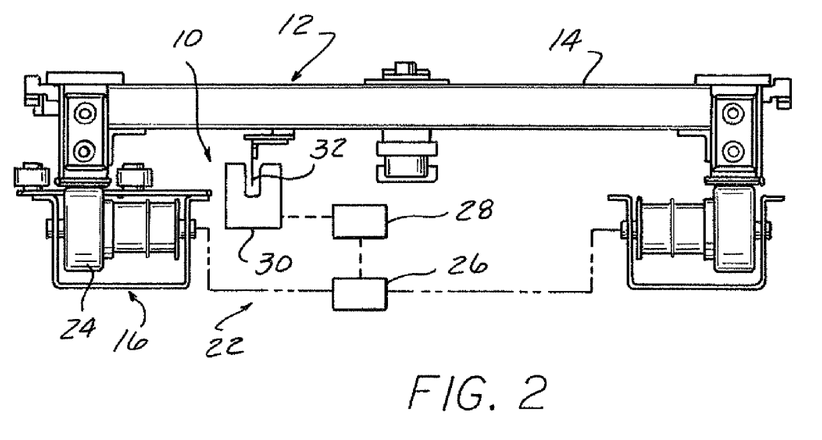
FIG. 2 is a cross-sectional view of the transport system and precise locating apparatus according to the present invention.
Figure 3:
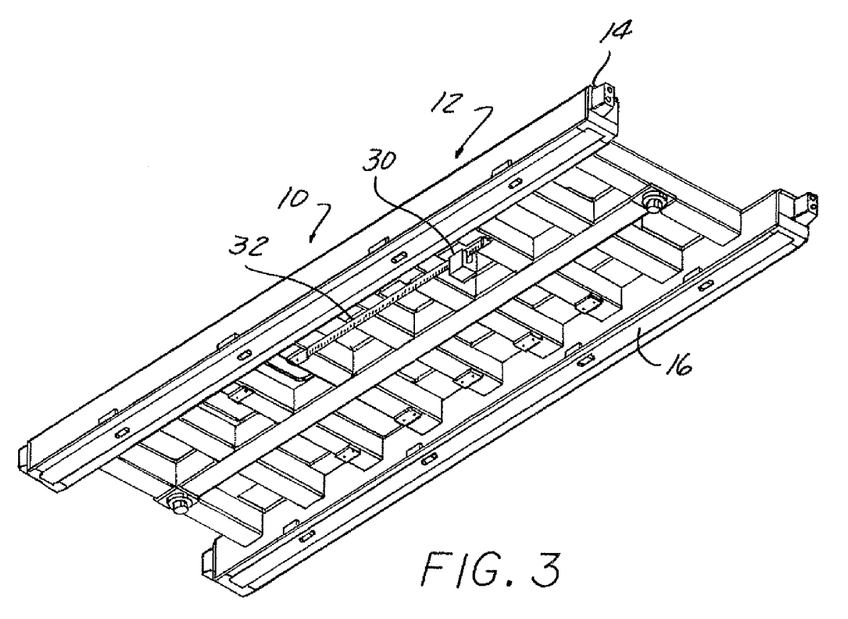
FIG. 3 is a bottom perspective view of the transport system with precise locating apparatus according to the present invention as illustrated in FIGS. 1 and 2.
Figure 4:
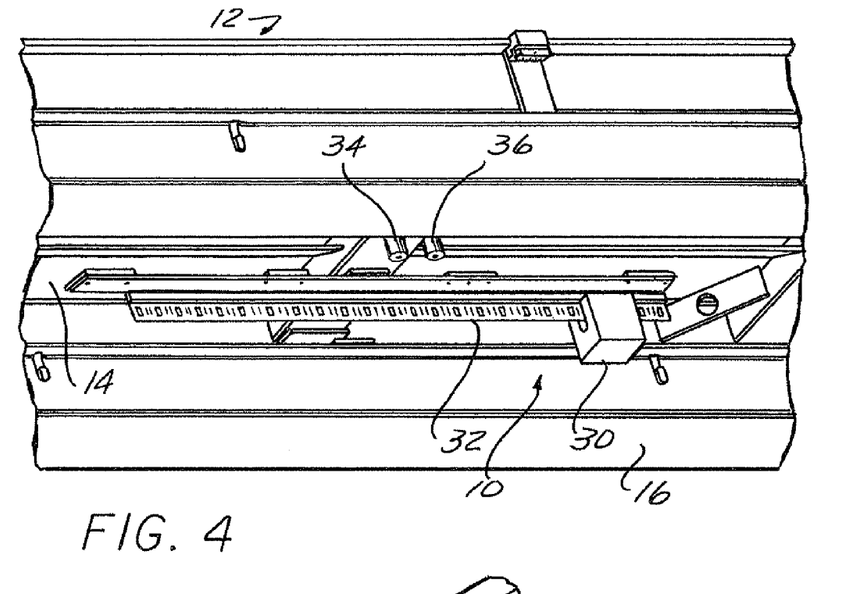
FIG. 4 is a detail of the precise locating apparatus according to the present invention with an encoder strip attached to the bottom of a movable portion of the transport system and a reader fixed in a stationary position with respect to the workstation.
Figure 5:
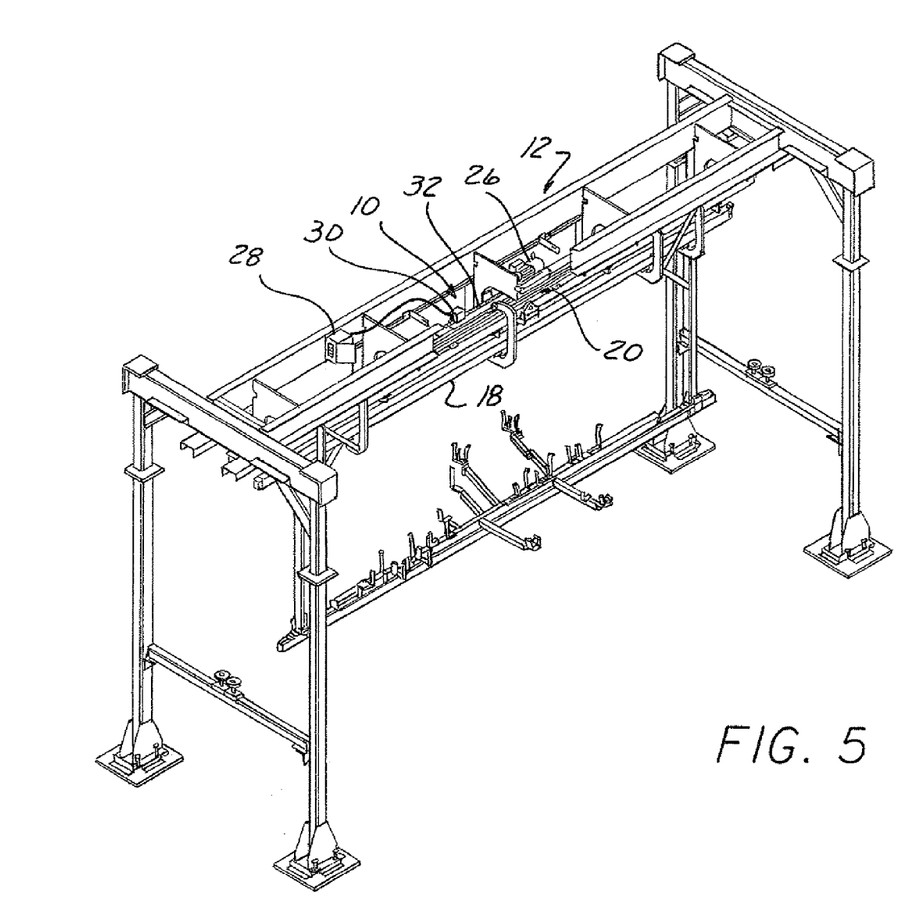
FIG. 5 is a perspective view of an alternative transport system with precise locating apparatus according to the present invention.
Figure 6:
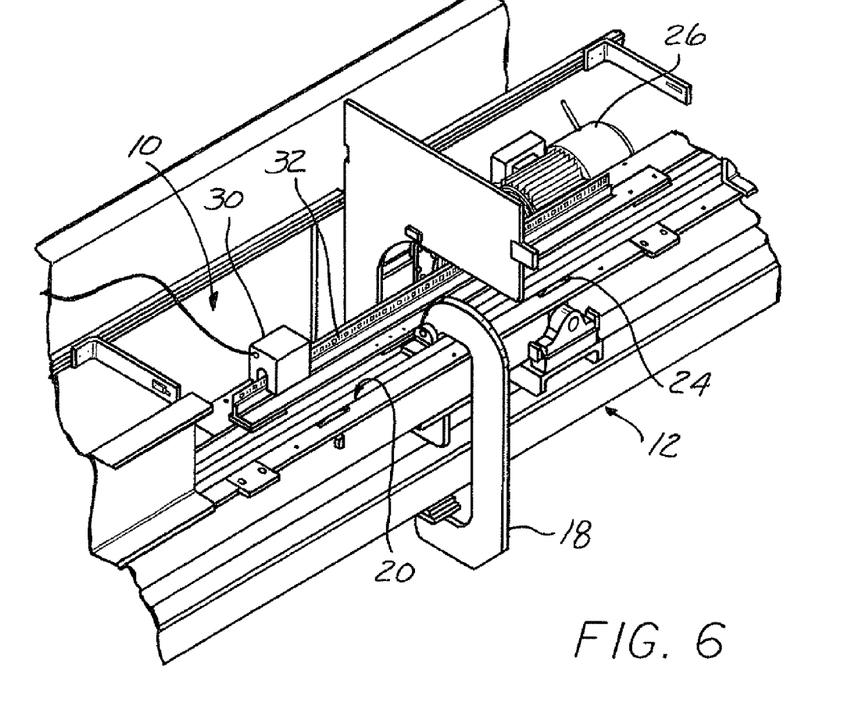
FIG. 6 is a detailed view of the precise locating apparatus according to the present invention.

Referring now to FIGS. 1-4, a precise locating apparatus 10 for a transport system 12 is illustrated. The transport system 12 can take the form of a movable pallet 14 carried on a versaroll drive system 16 as illustrated in FIGS. 1-4, or can take the form of an overhead trolley or carrier 18 supported for movement along a versaroll system 20 as illustrated in FIGS. 5-6. In either case, the transport system 12 includes a non-direct friction drive 22. The drive 22 can include at least one motor 26 driving a wheel 24 engagable with the movable portion 14 of the transport system 12. The wheel 24 is driven in response to rotation of the motor 26. The motor 26 is operated in response to signals received from a controller 28. The drive 22 can also include one or more pulleys for transferring rotational motion of the motor to additional drive wheels 24. The transport system 12 can include idler wheels along with the driven wheels along the path of travel if desired. The precise locating apparatus 10 can include an optical encoder reader 30 fixed in a stationary position at a workstation along the path of travel of the transport system 12. The optical encoder reader 30 can be operable to read an encoder strip 32 securely connected to the movable portion 14 of the transport system 12. The precise locating apparatus 10 according to the present invention allows the movable portion of the transport system 12 to be stopped within ±0.4 mm along the direction of the path of travel of the transport system. The precise locating apparatus 10 according to the present invention can also include a locating cam surface and cam follower, such as a locating member and corresponding rollers 34, 36 connected to the movable portion of the transport system in order to precisely locate the movable portion with respect to the workstation.

Referring now to FIGS. 5 and 6, the transport system 12 can include an overhead trolley or carrier 18 supported on a versaroll drive system 20. The precise locating apparatus 10 can include an optical encoder reader 30 fixed at a stationary location with respect to the workstation and an encoder strip 32 securely connected to the movable portion 18 of the transport system 12. The optical encoder reader 30 operably scans the encoder strip connected to the movable portion of the transport system as the movable portion 18 enters the workstation sending a signal to the controller 28. The controller 28 sends an appropriate signal to the drive motor 26 to control the movement of the movable portion of the transport system in response to the encoder signal. The versaroll drive system 22 can include at least one drive wheel 24 operably engaging the movable portion 18 of the transport system 12. The wheel 24 can be driven in rotation by at least one motor 26. One or more pulleys can also be driven by the motor 26 to drive additional wheels 24 positioned along the path of travel for the transport system. Idler wheels can also be provided along the path of travel if desired. The wheels 24, motor 26 and controller 28 define a non-direct, friction drive 22 for the transport system 12.

Figure 7:
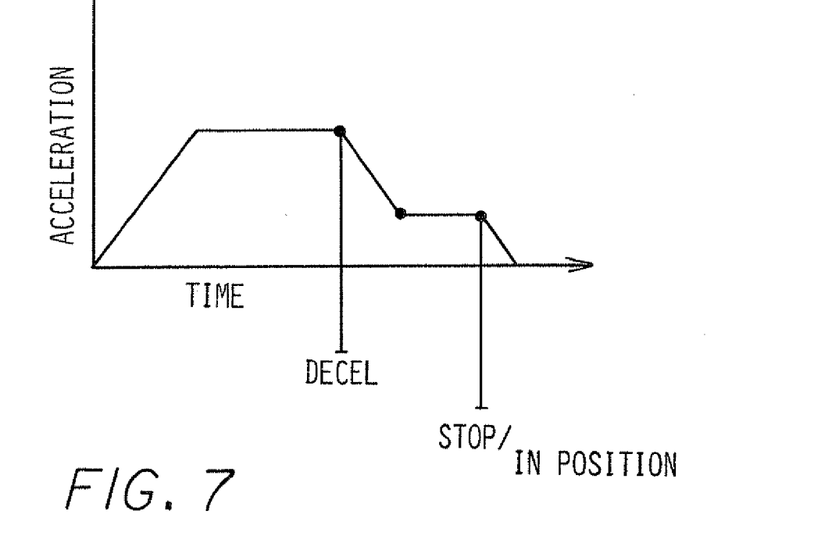
FIG. 7 is a graph depicting acceleration versus time of a known positioning system.

Referring now to FIG. 7, the graph depicts the prior known acceleration versus time graph for the transport system. Typically, the movable portion 14 or 18 can be accelerated to a desired speed and prior to entering the workstation can be decelerated to a lower speed prior to triggering the stop mechanism in order to stop movement of the movable portion with respect to the workstation. Typically, the time required for movement can be approximately 5 seconds over 24 feet and the deceleration to a lower speed prior to stopping allows positioning within ±4.0 mm using a slit bar configuration with an 8 mm slot to trigger the stopping of the movable portion. The high speed transport portion can achieve speeds in excess of approximately 300 feet per minute.

Figure 8:
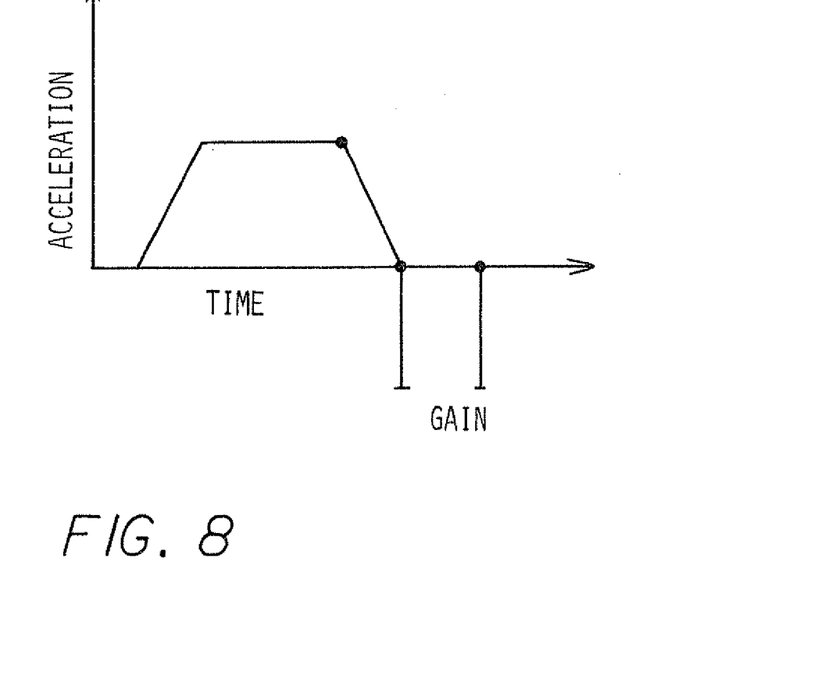
FIG. 8 is a graph illustrating acceleration versus time for the precise positioning system according to the present invention.

Referring now to FIG. 8, an acceleration versus time graph for the precise locating apparatus and transport system according to the present invention is illustrated. In this configuration, the movable portion of the transport system can be accelerated to the maximum speed until the initial reading of the encoder strip by the optical encoder reader at the workstation, at which point control of the drive can be operated automatically in response to signals from the reader to the motor controller. This allows the motor to be decelerated from maximum speed down to the stop position while eliminating the intermediate speed position used in the previously known configurations. This operational advantage allows the time of a typical transfer system to be reduced from 5 seconds to approximately 4 seconds. The optical absolute encoder system according to the present invention also allows positioning of the movable portion to within ±0.4 mm to enhance the accuracy of the positioning achievable with the non-direct friction drive system. The encoder strip connected to the movable portion and the optical absolute encoder reader fixed at a stationary position at the workstation operating through the controller and the motor define a closed loop system for control of the movable portion with respect to the workstation. This closed loop control system for positioning of the pallet with respect to the workstation also does not require any additional electrical or power connections to the movable portion of the transport system. As previously indicated, this control system can be used in both the power roll drive systems and versaroll drive systems of Progressive Tool & Industries, Co., a corporation of the State of Michigan, having its principal place of business at 21000 Telegraph Road, Southfield, Mich. 48034.

The present invention can include an optical bar to accurately position the workpiece in a desired location. The closed loop controlled, non-direct drive according to the present invention is operable to provide absolute positioning of the workpiece carrier with respect to the workstation. The present invention is particularly well suited for respot workstation applications, although it should be recognized that the present invention is applicable to other applications without departing from the scope of the present invention. The present invention can be used with an electric monorail system conveyor, or with a VersaRoll conveyor system, or with a PowerRoll conveyor system, or with any other closed loop controlled, friction drive conveyor system configurations known to those skilled in the art. The present invention can include an optical encoder system, a magnetic encoder system, and/or any other absolute positioning encoder known to those skilled in the art assembled in a closed loop controlled, non-direct, friction drive configuration. The present invention can be applicable to non-self propelling, externally driven conveyor systems, located either in an overhead configuration, or in an underlying configuration. By way of example and not limitation, the conveyor system can be a pallet delivery system, or an overhead rail delivery system.

According to the present invention, the encoder can pick up one or more pieces of information from the encoder strip attached to the workpiece carrier. The encoder strip can be an optical encoder strip, magnetic encoder strip, or any other accurate absolute positioning encoder strip known to those skilled in the art. According to the present invention, the stationary encoder reader head positioned at the workstation can pick up a pallet ID segment of information prior to encountering the absolute positioning segment of information in the center of the encoder strip. The pallet ID information can be located at both outer ends of the encoder strip so that the pallet ID information is encountered by the encoder reader head prior to encountering the absolute positioning information segment located adjacent the midpoint of the encoder strip. It should be recognized that additional information can also be included on the encoder strip. By way of example and not limitation, the pallet ID information can be replaced and/or augmented with workpiece identification information. By way of example and not limitation, a pallet conveyor system according to the present invention can include non-self propelling pallets externally driven by a closed loop controlled, non-direct drive, such as, by way of example and not limitation, a friction drive device. The closed loop feedback control system can determine the position of the movable member, such as a pallet or an overhead trolley, based on the signal from the encoder reader and in response to the signal can modulate the motor of the non-direct drive, or friction drive, to control the position of the movable member. According to the present invention, this combination of elements provides for flexible, programmable control systems. Since the present invention can identify a particular configuration of movable member, such as a pallet or an overhead trolley, and/or the particular configuration of the carried workpiece, in response to the signal from the encoder reader at the workstation, the control system can stop the movable member at any desired location for that configuration. In particular, the present invention can stop a single movable member at a plurality of positions at a single workstation to allow for better access to different locations of the carried workpiece for processing by automated equipment, by way of example and not limitation, such as welding guns. For example, an optical encoder strip connected to a pallet can be used to accurately reposition the same pallet at different positions at the same workstation. The present invention can also stop different movable member configurations, such as different pallet configurations or different overhead trolley configurations, at different locations with respect to a workstation to improve accessibility to various locations on the different workpieces by automated equipment. For example, an optical encoder strip connected to an overhead trolley can be used to accurately position different trolleys at different positions at the same workstation.

The present invention can provide for the elimination of separate lifters for accurate positioning of the pallet with respect to the workstation. In particular, according to the present invention, the pallet can be accurately positioned along the X-axis corresponding to the axis of travel to a precision of ±0.2 millimeters, in the Y-axis perpendicular to the X-axis to an accuracy of ±0.002 inches, and in the vertically extending Z-axis perpendicular to the X and Y-axes to an accuracy of ±0.005 inches. This degree of accuracy can be provided with machine tool surfaces and can eliminate the need for a lift in a pallet conveyor system configuration for a respot workstation. It should be recognized that a geometry workstation can require even more precise location of the pallet with respect to the workstation, and that this can be accomplished according to the present invention by providing a lift device or another type of positioning device, by way of example and not limitation, such as at least one locating pin, to accurately position the workpiece carrier and carried workpiece with respect to the workstation for processing. Depending on the positioning specifications and/or requirements, an alternative method could be used without requiring a lifter or other devices, where positioning can be accomplished according to the present invention with tighter tolerances of components for controlling the precise location along the X-axis, Y-axis, and/or Z-axis as required to meet the positioning specifications and/or requirements.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for positioning a workpiece carrier with respect to an assembly line workstation comprising:
   a workpiece carrier for transporting a workpiece along an assembly line path of travel relative to a workstation;
   a drive for selectively moving the workpiece carrier along the path of travel;
   a code reader positioned at the workstation along the path of travel;
   a coded strip positioned along the path of travel wherein one of the code reader and the coded strip is selectively movable relative to one another, the coded strip having a first end and a second end defining a code strip length and including:
   (a) a first identification information segment of at least one of the workpiece carrier type or the workpiece type for positive identification of the carrier type or the workpiece type; and
   (b) a logistical positioning information segment for positive positioning of code strip relative to the code reader; and
   a controller in electronic communication with the code reader and the drive defining a closed-loop feedback control system to selectively position the carrier in a desired location.

2. The apparatus of claim 1 wherein the coded strip further comprises a second identification segment separated along the strip length from the first identification segment.

3. The apparatus of claim 2 wherein the first identification segment is adjacent the first end of the strip and the second identification segment is adjacent the second end of the strip.

4. The apparatus of claim 3 wherein the code strip positioning segment is positioned between the first and the second information segments.

5. The apparatus of claim 1 wherein the code strip information comprises a plurality of through apertures selectively positioned along the strip length and optically readable by the code reader.

6. The apparatus of claim 1 wherein the coded strip is elongate and positioned along a longitudinal axis of the workpiece carrier.

7. The apparatus of claim 1 wherein the coded strip is connected to the workpiece carrier and travels with the workpiece carrier along the path of travel and the code reader is stationary relative to the workpiece carrier.

8. The apparatus of claim 1 wherein the controller further comprises a closed loop feedback control system which selectively activates the drive based on output signals generated by the code reader.

9. The apparatus of claim 1 further comprising a support structure to support the workpiece carrier along the path of travel, the support structure further comprises at least one elongate rail operably engaged with the workpiece carrier.

10. The apparatus of claim 9 wherein the drive is mounted on the support structure and is selectively activated by the controller to move the workpiece carrier along the path of travel.

11. The apparatus of claim 10 wherein the at least one rail comprises a pair of elongate rails spaced from one another and positioned along the path of travel.

12. The apparatus of claim 11 wherein the drive comprises a plurality of vertically oriented wheels rotatably mounted to the rails and in frictional engagement with the workpiece carrier, the wheels selectively activated for movement of the workpiece carrier relative to the support structure.

13. The apparatus of claim 1 wherein the workpiece carrier comprises a pallet having a workpiece support surface, the pallet supported by a support structure having a pair of rails positioned along the path of travel.

14. The apparatus of claim 1 wherein the workpiece carrier is a trolley having a workpiece support surface, the trolley suspended from an elevated rail positioned above the workpiece support surface.

15. The apparatus of claim 1 wherein the controller is operative to:
   identify a desired location for the carrier along the path of travel based on a reading of the first identification segment, and
   selectively position the carrier in the desired location based on a reading of the positioning segment.

16. A method for transporting and selectively positioning a partially completed vehicle along a path of travel, the method comprising the steps of:
   moving at least one workpiece carrier supporting the vehicle along a path of travel;

reading an coded strip having a first identification segment and a positioning segment by a code reader on relative movement between the code strip and the code reader as the workpiece carrier moves along the path of travel;

identifying a desired position for the workpiece carrier along the path of travel based on a reading of the first identification segment; and selectively activating a drive for selectively moving the workpiece carrier to the desired position based on the relative position of coded strip positioning segment to the code reader.

17. The method of claim 16 further comprising the step of:

generating a signal from the code reader to a controller based on reading of one or more of the segments on the coded strip; and generating a signal from the controller to selectively activate the drive to selectively move the workpiece carrier toward the desired position along the path of travel.

18. The method of claim 17 wherein the step of generating a signal from the controller further comprises calculating the desired positional movement of the workpiece from the signal generated by the code reader through a closed loop feedback control system to selectively activate the drive to move the workpiece carrier to the desired position along the path of travel.

19. An apparatus for transporting and selectively positioning a partially completed vehicle along a path of travel, the apparatus comprising:

means for moving at least one workpiece carrier supporting the vehicle along a path of travel;

means for reading an coded strip having a first identification segment and a positioning segment by a code reader on relative movement between the code strip and the code reader as the workpiece carrier moves along the path of travel;

means for identifying a desired position for the workpiece carrier along the path of travel based on a reading of the first identification segment; and means for selectively activating a drive for selectively moving the workpiece carrier to the desired position based on the relative position of coded strip positioning segment to the code reader.

\* \* \* \* \*